Patented Nov. 25, 1941

2,264,212

UNITED STATES PATENT OFFICE 2,264,212

COPPER FUNGICIDE

Ernest Charles Large, Wimbledon, London, England, assignor to Boots Pure Drug Company Limited, Nottingham, England, a British company No Drawing. Application March 31, 1938, Serial No. 199,289. In Great Britain April 6, 1937

5 Claims. (Cl. 167—16)

This invention relates to fungicidal compositions in which the active agent is a copper derivative and to methods for the production of such compositions.

The object of the invention is to provide fungicidal copper compounds in the form of dry powders, which may be applied as dusts in the dry condition, or which may also be made to disperse readily and completely in water, yielding fine suspensions suitable for application by spraying and containing fungicidally-active copper compounds in the form of particles of that order of size hitherto only obtained with preparations in a liquid, paste or thixotropic form. The preparation of such fungicides in the form of dry powders present important advantages over the said liquid and paste preparations both as regards convenience in use and reduction in packing costs. Further, the invention aims at providing fungicidal preparations having the said fineness of particle size, made by a simple and straight-forward process, without filtration or the removal of any of the products of the reactions and without special plant so that the product can be made relatively cheaply.

According to the present invention, the process for the production of a fungicidal composition consists in producing a complex insoluble basic copper salt in a highly dispersed condition, in the presence of bentonite or similar hydrophilic clay which is retained in the final product. The bentonite or other clay apparently serves as an inorganic protective colloid during the formation of the insoluble copper salt and the resulting product containing copper salt and bentonite in intimate admixture can be dried without decomposition or the destruction of its colloidal properties. Such a composition can be used either as a dry powder or as a suspension in water for spraying. The process, with which the present invention is more particularly concerned, is a process whereby such above mentioned highly dispersed insoluble complex basic copper salts are produced by the interaction of soluble copper salts with alkalies or alkaline earths in presence of bentonite or similar hydrophilic clay which is retained in the final product. The alkali which it is preferred to employ in the reactions which are used in carrying out the processes of the invention is sodium carbonate, while the soluble copper salt which it is preferred to use is copper sulphate since it is found that, apart from questions of cost of material, the sodium sulphate, which is formed as a by-product in reactions where these substances are used as starting materials, exercises a useful purpose in the product by preventing "balling" of the product on the addition of water while it is at the same time innocuous to foliage.

A particular effective fungicidal composition can be made by a process according to the invention containing an insoluble basic chloride of copper, bentonite and sodium sulphate, and in carrying out the process for making this composition according to the invention one method is to use four molecular proportions of crystals of copper sulphate, two molecular proportions of common salt, and three molecular proportions of crystals of washing soda and to heat this mixture so that the reaction carried out in the presence of the bentonite, takes place in the water of crystallisation of the copper sulphate and washing soda, and the product is dried in one continuous operation. It is, however, possible to use soda ash and the equivalent amount of water instead of the crystals of washing soda.

A composition in which the fungicidal copper salt is a basic sulphate may, according to another process by which the invention may be carried into effect, be made by heating in the requisite proportions a mixture of copper sulphate and an alkali with bentonite. Thus, by heating 4 molecular proportions of copper sulphate and 3 molecular proportions of sodium carbonate along with the requisite quantity of bentonite a composition containing the trioxysulphate of copper ($CuSO_4.3CuO.nH_2O$) is obtained.

Further compositions containing mixtures of basic sulphates and carbonates of copper are obtained, according to another method by which the invention may be practised, by using the proportions of copper sulphate and washing soda commonly employed in the preparations of Burgundy mixture. Owing, however, to the heating in the presence of bentonite the composition of the basic salt differs from that of dried Burgundy mixture, and it is precipitated in the form of exceedingly fine particles, so that the product disperses in water forming a suspension greatly superior to that which can be obtained from dried Burgundy mixture.

When the product, containing for example the basic chloride or sulphate mentioned above, is to be prepared in a form suitable for use after dilution in water, it is found that an improvement is obtained by adding a small amount of sodium pyrophosphate in the form of a fine powder, the effect of this addition being to inhibit or delay flocculation when the composition is mixed with water. If desired, a wetting compound may be incorporated in the product, and for example, for this purpose the sodium salt of sulphonated lauryl alcohol may be blended with it at the time of adding the sodium pyrophosphate. When the composition is to be used in the dry state as a dust, the sodium pyrophosphate may be omitted and the copper content adjusted by adding inert diluents such as china clay, talc and the like.

In order that the invention may be clearly understood and readily carried into effect, some examples of methods of making novel compositions according to the invention will now be more fully described.

Example 1

In making a product containing insoluble basic chloride of copper, a thousand parts by weight of copper sulphate crystals, 117 parts by weight of common salt, 858 parts of washing soda crystals, and 115 parts by weight of bentonite are employed. The copper sulphate and washing soda crystals are crushed to pass through a $\frac{1}{16}$ inch mesh and are mixed with the salt and the bentonite, which must be well distributed through the mass. The reaction commences during mixing in the cold and the mixture becomes moist. It is then steam-heated in open copper pans or trays when it runs as a thin paste, and a vigorous reaction takes place. The evolution of gas causes the mass to "rise" and carbon dioxide and water vapour are driven off. The mass is raked over during the reaction with a wooden or copper rake and care must be taken to avoid local excess of alkali which gives rise to the formation of black copper oxide. The reaction is complete within two hours, but heating is continued to dry the product down until it contains only about 5 per cent of water. It then consists of a pale green amorphous mass which crumbles very readily when pressed. The copper content of the product at this stage is approximately 22 per cent by weight.

As a result of the novel method of carrying out the reaction, the new composition contains the basic copper salt $(CuCl_2.3CuO.nH_2O)$ in an extremely fine state of division associated with the bentonite and mixed with soluble and partially dehydrated sodium sulphate. On merely stirring the product into water, the particles are readily and completely dispersed, forming a very fine suspension of pale green colour. At normal concentrations at which the material is used, there is no appreciable settlement over a period of several hours; the range of the sizes of the particles is of the same order as that in colloidal copper preparations hitherto only obtainable in paste or liquid form. The sodium sulphate in the product is harmless to foliage, and it is found that owing to the presence of the bentonite, the deposit formed on leaves by spraying is remarkably adhesive and resists washing off by the rain.

Example 2

In making a composition containing the trioxysulphate of copper the common salt as already mentioned is omitted and the procedure may be as follows:

A thousand parts by weight of copper sulphate, 858 parts of washing soda crystals, 115 parts by weight of bentonite are employed. The copper sulphate and washing soda crystals are crushed as in Example 1 and are mixed with the bentonite which must be well distributed through the mass. The rest of the process is as in Example 1.

Example 3

In making the novel composition with proportions of copper sulphate and washing soda corresponding to those used in the production of Burgundy mixture, the procedure is exactly as in Example 2. The proportions used are such that with a thousand parts by weight of copper sulphate, the amount of washing soda crystals employed is 1250 parts by weight.

When any of the novel products are to be prepared in a form suitable for use after dilution in water it is crushed so as to pass a 20 I. M. M. screen (fine grinding is not necessary) and 2 per cent of sodium pyrophosphate is added in the form of a fine powder. Citric acid, tartaric acid and other hydroxy-acids and their salts are found also to inhibit flocculation, but sodium pyrophosphate is cheaper and more effective. The addition of the sodium pyrophosphate completes the manufacturing process. The product may then be packed in tins or in bags with waterproof paper linings, or in waxed paper within cardboard cartons. It has already been mentioned that a wetting compound may be added at the time of adding the sodium pyrophosphate.

When the product is to be prepared in a form suitable for application as a dust, the sodium pyrophosphate may be omitted, and inert diluents, talc, china clay and the like added to adjust the copper content. For application as a dust, the product is ground to pass a 200 or 300 I. M. M. screen according to requirements.

In the above examples, instead of carrying out the reaction merely in the water of crystallisation, additional water may be used.

I claim:

1. The process for the production of a fungicidal composition which consists in mixing copper sulphate crystals, common salt and a carbonate of an alkali metal taken from the group consisting of the alkali and alkaline earth metals with bentonite and heating said mixture to form a product containing a basic copper chloride in a highly dispersed condition.

2. The process for the production of a fungicidal composition which consists in mixing copper sulphate and an amount of a carbonate of an alkali metal taken from the group consisting of the alkali and alkaline earth metals, of at least three quarters the molecular equivalent of said copper sulphate with bentonite and heating said mixture to form a product comprising highly dispersed complex basic salts of copper.

3. The process according to claim 2, in which said carbonate is used in an amount of three quarters the molecular equivalent of said copper sulphate, and said mixture is heated to form a product containing the trioxysulphate of copper $(CuSO_4.3CuO.nH_2O)$ in a highly dispersed condition.

4. The process for the production of a fungicidal composition which consists in mixing copper sulphate crystals, common salt and washing soda crystals and reacting said materials by heating in the presence of bentonite in the water of crystallisation of said copper sulphate and washing soda, without the addition of further water.

5. A process for the production of a fungicidal composition which consists in intimately mixing a soluble copper salt with a substance selected from the group consisting of (1) sodium chloride and one of the group consisting of sodium carbonate and lime, (2) sodium carbonate and (3) lime, adding hydrophilic clay and heating the resulting mixture in the presence of water to form a complex basic salt in highly dispersed condition in said hydrophilic clay.

ERNEST CHARLES LARGE.